United States Patent
Na et al.

(10) Patent No.: US 12,103,545 B2
(45) Date of Patent: Oct. 1, 2024

(54) METHOD AND APPARATUS FOR MONITORING UNMANNED GROUND VEHICLE

(71) Applicant: DAEGU GYEONGBUK INSTITUTE OF SCIENCE AND TECHNOLOGY, Daegu (KR)

(72) Inventors: Gyu Jin Na, Gimcheon-si (KR); Yong Soon Eun, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 216 days.

(21) Appl. No.: 17/535,833

(22) Filed: Nov. 26, 2021

(65) Prior Publication Data

US 2022/0410913 A1    Dec. 29, 2022

(30) Foreign Application Priority Data

Jun. 28, 2021    (KR) .................... 10-2021-0083952

(51) Int. Cl.
*B60W 50/02*    (2012.01)
*B60W 40/068*    (2012.01)
(Continued)

(52) U.S. Cl.
CPC ...... *B60W 50/0205* (2013.01); *B60W 40/068* (2013.01); *B60W 60/00* (2020.02); *B60W 2050/0054* (2013.01); *B60W 2050/021* (2013.01); *B60W 2050/0215* (2013.01); *B60W 2050/022* (2013.01); *B60W 2520/14* (2013.01); *B60W 2552/40* (2020.02)

(58) Field of Classification Search
CPC ............ B60W 50/0205; B60W 60/00; B60W 40/068; B60W 2552/40; B60W 2050/0054; B60W 2050/021; B60W 2050/0215; B60W 2050/022; B60W 2520/14
See application file for complete search history.

(56) References Cited

U.S. PATENT DOCUMENTS

2019/0359252 A1*   11/2019   Yu ................... G06F 17/142
2021/0188252 A1*    6/2021   Lu ................... B60W 40/12
(Continued)

FOREIGN PATENT DOCUMENTS

JP    2001-264132    9/2001
JP    2016-113050    6/2016
(Continued)

OTHER PUBLICATIONS

Samia Mellah et al., "4-mecanum wheeled mobile robot actuator fault detection & isolation using unknown input observerbased approach", European Control Conference ECC, May 2020, hal-02454947v1.
(Continued)

*Primary Examiner* — Peter D Nolan
*Assistant Examiner* — Wae L Louie
(74) *Attorney, Agent, or Firm* — LEX IP MEISTER, PLLC

(57) ABSTRACT

According to an embodiment, provided are a method and an apparatus for monitoring an unmanned ground vehicle (UGV), for detecting a failure of a UGV actuator in consideration of terrain information. Accordingly, the accuracy of detecting a failure of the UGV is improved.

14 Claims, 6 Drawing Sheets

(51) Int. Cl.
 *B60W 60/00* (2020.01)
 *B60W 50/00* (2006.01)

(56) References Cited

U.S. PATENT DOCUMENTS

| | | | | |
|---|---|---|---|---|
| 2022/0111895 | A1* | 4/2022 | Schumann | B62D 15/025 |
| 2022/0144257 | A1* | 5/2022 | Maeda | B60W 60/00274 |
| 2022/0281456 | A1* | 9/2022 | Giovanardi | G01S 17/931 |
| 2022/0410913 | A1* | 12/2022 | Na | B60W 50/0205 |
| 2022/0410914 | A1* | 12/2022 | Na | G05B 23/0289 |
| 2023/0182745 | A1* | 6/2023 | Misu | G01S 17/931 |
| | | | | 340/576 |

FOREIGN PATENT DOCUMENTS

| | | |
|---|---|---|
| KR | 10-2010-0071554 | 6/2010 |
| KR | 10-2019-0045488 | 5/2019 |
| KR | 10-2020-0140449 | 12/2020 |

OTHER PUBLICATIONS

KIPO, Office Action of KR 10-2021-0083952 dated Jun. 10, 2022.
Juqi Hu et al., "Tire-Road Friction Coefficient Estimation under Constant Vehicle Speed Control," IFAC-PapersOnLine, vol. 52, No. 8, pp. 136-141, 2019, doi: 10.1016/j.ifacol.2019.08.061.
KIPO, Notice of Allowance of KR 10-2021-0083952 dated Nov. 22, 2022.

* cited by examiner

METHOD AND APPARATUS FOR MONITORING UNMANNED GROUND VEHICLE

CROSS-REFERENCE TO RELATED APPLICATION

This present application claims the benefit of priority to Korean Patent Application No. 10-2021-0083952, entitled "METHOD AND APPARATUS FOR MONITORING UNMANNED GROUND VEHICLE," filed on Jun. 28, 2021, in the Korean Intellectual Property Office, the entire disclosure of which is incorporated herein by reference.

FIELD

The present disclosure relates to a method and an apparatus for monitoring an unmanned ground vehicle (UGV), and more particularly, to a method and an apparatus for monitoring a UGV for detecting a failure of a UGV actuator in consideration of terrain information.

BACKGROUND

The following description is made only for the purpose of providing background information in relation to embodiments of the present disclosure, and the content to be described does not necessarily constitute prior art.

An unknown input observer (UIO) is a model-based state estimation technique capable of accurately estimating the state of a system on the basis of model information of the system, control inputs, and sensor signals, even in an environment where an unknown disturbance is applied to the system.

Meanwhile, an unmanned ground vehicle (UGV) is a vehicle that operates on the ground without a driver, and an unknown input observer and a failure detector based thereon may be utilized for remote control of the UGV.

For accurate remote control of the UGV, it is necessary to consider the terrain on which the UGV is traveling.

The above-mentioned prior art is technical information that the inventor possessed for derivation of the present disclosure or acquired in the process of derivation of the present disclosure, and is not always a known technique disclosed to the public prior to the filing of the present disclosure.

SUMMARY

An aspect of the present disclosure is to provide a UGV monitoring method for monitoring the state of a UGV in consideration of terrain information on a current position of the UGV.

Another aspect of the present disclosure is to provide a UGV monitoring apparatus including an unknown input observer designed to reflect the effect of the friction coefficient of the ground surface on which the UGV is traveling.

Aspects of the present disclosure are not limited to the above-mentioned aspects, and other aspects and advantages of the present disclosure that are not mentioned above may be understood by the following description, and will be more clearly understood by the embodiments of the present disclosure. In addition, it will be appreciated that aspects and advantages of the present disclosure can be realized by the means indicated in the claims and combinations thereof.

A method for monitoring a UGV according to an embodiment of the present disclosure may include obtaining a sensor signal for a UGV state from at least one sensor disposed in the UGV, determining a friction information estimate of a ground surface at a current position of the UGV, determining a sensor signal estimate for the UGV state by an unknown input observer designed on the basis of the friction information estimate, and detecting a failure of an actuator of the UGV on the basis of a residue between the sensor signal and the sensor signal estimate.

An apparatus for monitoring a UGV according to an embodiment of the present disclosure may include a memory configured to store at least one instruction, and a processor, wherein the processor may be configured to, by executing the at least one instruction, obtain a sensor signal for a UGV state from at least one sensor disposed in the UGV, determine a friction information estimate of a ground surface at a current position of the UGV, determine a sensor signal estimate for the UGV state by an unknown input observer designed on the basis of the friction information estimate, and detect a failure of an actuator of the UGV on the basis of a residue between the sensor signal and the sensor signal estimate.

Other aspects, features, and advantages other than those described above will become apparent from the following drawings, claims, and detailed description of the disclosure.

According to the embodiments, UGV monitoring based on an unknown input observer is provided in consideration of terrain information.

According to the embodiments, the accuracy of detecting a failure of an actuator of the UGV is improved by an unknown input observer reflecting the friction coefficient and a failure detector based thereon.

The effects of the present disclosure are not limited to those mentioned above, and other effects not mentioned above will be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Hereinafter, the present disclosure will be described in more detail with reference to the drawings. The present disclosure may be implemented in various different forms, and is not limited to the embodiments described herein. Although the configuration that is not directly related to the description will be omitted from the following embodiments in order to clearly explain the present disclosure, this does not mean that the omitted configuration is unnecessary in implementing an apparatus or system to which the idea of present disclosure is applied. In addition, like reference numbers indicate like or similar elements throughout the specification.

In the following description, although the terms "first," "second," etc. may be used herein to describe various elements, these elements should not be limited by these terms, and these terms may be only used to distinguish one element from another element. In addition, in the following description, the singular expression includes the plural expression unless the context clearly dictates otherwise.

In the following description, it should be understood that the terms "comprise," "include," "have," and the like are intended to specify the presence of features, integers, steps, operations, elements, or parts, stated in the specification, or combinations thereof, but are not intended to preclude the presence or addition of one or more other features, integers, steps, operations, elements, parts, and/or combinations thereof.

Hereinafter, the present disclosure will be described in detail with reference to the accompanying drawings.

Figure 1:
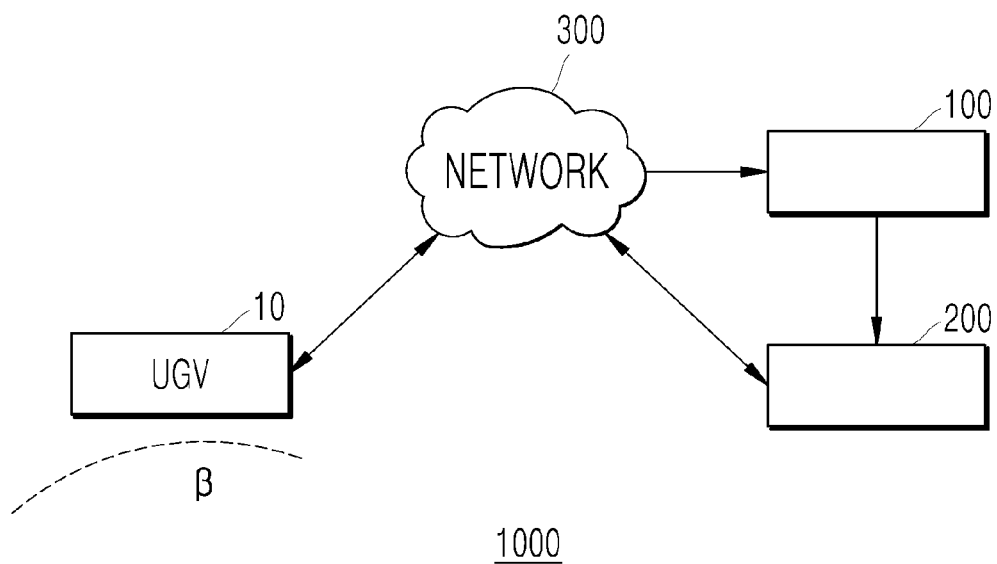
FIG. 1 schematically shows an exemplary operating environment of a UGV control system according to an embodiment.

FIG. 1 schematically shows an exemplary operating environment of a UGV control system according to an embodiment.

The UGV control system 1000 according to an embodiment includes a UGV 10, a UGV monitoring apparatus 100 for monitoring the operation state of the UGV and detecting a failure of an actuator of the UGV, and a controller 200 for remotely controlling the UGV 10.

The UGV 10 is a vehicle that operates without a driver on the ground, receives a remote control signal through a network 300, and drives and performs a mission according to the received control signal.

The UGV 10 may be equipped with at least one sensor, and transmit a sensor signal to an external device such as the UGV monitoring apparatus 100 and/or the controller 200 through the network 300. Here, at least one sensor detects state information of the UGV 10, and includes a GPS sensor, an IMU sensor, a gyro sensor, an image sensor, and the like.

The UGV monitoring apparatus 100 according to the embodiment is a computing device including a processor 110 and a memory 120 for storing at least one instruction to be executed by the processor 110, which will be described below with reference to FIG. 2, and may monitor the operation state of the UGV 10 and determine whether there is a failure.

The UGV monitoring apparatus 100 receives, from the UGV 10, a sensor signal, which is detected by at least one sensor disposed in the UGV 10, through the network 300. The UGV monitoring apparatus 100 estimates the operation state of the UGV 10 on the basis of the received sensor signal. For example, the UGV monitoring apparatus 100 may determine whether there is a failure in the actuator of the UGV 10 on the basis of the received sensor signal.

The controller 200 may generate a control signal for controlling the UGV 10 on the basis of the sensor signal received from the UGV 10. In addition, the controller 200 may generate a control signal for controlling the actuator of the UGV 10 estimated to be malfunctioning and/or the actuator of the UGV 10 estimated to be normal on the basis of a failure signal received from the UGV monitoring apparatus 100.

In one example, the UGV monitoring apparatus 100 and the controller 200 may be implemented as computer programs executing respective functions. For example, the computer programs implementing the UGV monitoring apparatus 100 and the controller 200 may be stored in a memory 120 and executed by the processor 110, which will be described below with reference to FIG. 2. For example, the computer programs implementing the UGV monitoring apparatus 100 and the controller 200 may be executed by separate computing devices, respectively.

The network 300 provides signals and data communication between the UGV 10 and the UGV monitoring apparatus 100, and between the UGV 10 and the controller 200. For example, the network 300 may provide various types of wired and wireless communication media and protocols. Additionally, the network 300 may provide a data transmission/reception path between the UGV monitoring apparatus 100 and the controller 200.

The UGV monitoring apparatus 100 according to the embodiment estimates the state of the UGV 10 in consideration of terrain information on the current position of the UGV 10.

Here, the state of the UGV 10 includes the states of a plurality of actuators driving the UGV 10 (e.g., whether there is a failure in the actuator). Here, the terrain information includes a friction coefficient ß of the ground surface at the position where the UGV 10. is traveling or has stopped.

For example, the UGV monitoring apparatus 100 may determine whether there is a failure in the plurality of actuators of the UGV 10 in consideration of the friction coefficient β of the place where the UGV 10 is currently located.

Figure 2:
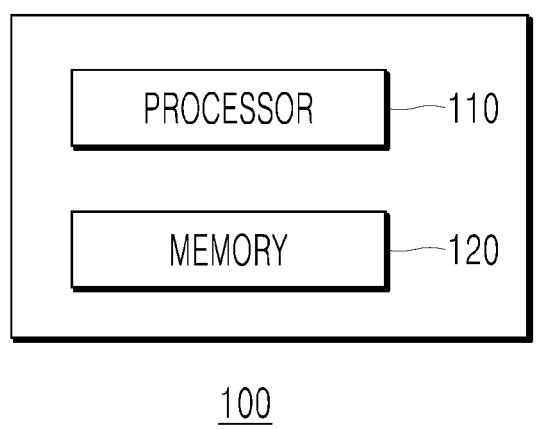
FIG. 2 is a block diagram of a UGV monitoring apparatus according to an embodiment.

FIG. 2 is a block diagram of a UGV monitoring apparatus according to an embodiment.

The UGV monitoring apparatus 100 according to an embodiment includes a processor 110 and a memory 120.

The processor 110 is a kind of central processing unit, and may perform monitoring of the UGV according to an embodiment by executing one or more instructions stored in the memory 120.

The processor 110 may include any type of device capable of processing data. The processor 110 may indicate, for example, a data processing device that has a physically structured circuit to perform a function expressed as a code or instruction included in a program and is embedded in hardware. Examples of the data processing device embedded in the hardware described above may include a microprocessor, a central processing unit (CPU), a processor core, a multiprocessor, an application-specific integrated circuit (ASIC), a field programmable gate array (FPGA), a graphics processing unit (GPU), or the like, but the data processing device is not limited thereto. The processor 110 may include one or more processors.

The memory 120 may include internal memory and/or external memory, and may include volatile memory such as DRAM, SRAM, SDRAM, or the like, non-volatile memory such as one-time programmable ROM (OTPROM), PROM, EPROM, EEPROM, mask ROM, flash ROM, NAND flash memory, NOR flash memory, or the like, a flash drive such as an SSD, a compact flash (CF) card, an SD card, a micro-SD card, a mini-SD card, an Xd card, a memory stick, or the like, or a storage device such as an HDD. The memory 120 may include, but is not limited to, magnetic storage media or flash storage media.

The memory 120 may store and provide at least one instruction executable by the processor 110. The instruction, when executed by the processor 110, causes the processor 110 to execute a UGV monitoring process according to the embodiment.

The processor 110 may be configured to obtain a sensor signal for the UGV state from at least one sensor disposed in the UGV 10, determine a friction information estimate of the ground surface at the current position of the UGV 10, determine a sensor signal estimate for the UGV state by an unknown input observer 30 designed on the basis of the friction information estimate, and detect a failure of an actuator of the UGV 10 on the basis of the residue between the obtained sensor signal and the sensor signal estimate. This will be described in detail with reference to FIG. 4.

In one example, the sensor signal corresponds to a vector including a global position, a yaw angle, and a yaw rate of the UGV 10.

The processor 110 may be configured to execute the unknown input observer 30 designed on the basis of a UGV rated model based on the determined friction information estimate.

In one example, the UGV rated model corresponds to a dynamic model based on a system matrix for the state of the UGV 10 and a failure matrix corresponding to the failure signal of the actuator of the UGV 10.

The system matrix corresponds to a constant matrix including a constant defined on the basis of the determined friction information estimate and the mass of the UGV 10.

The failure matrix corresponds to a time varying matrix including a time varying parameter defined on the basis of the yaw angle of the UGV 10.

In one example, the unknown input observer 30 may include a plurality of unknown input observers 30 that are associated one-to-one with a plurality of actuators of the UGV 10. The processor 110 may be configured determine a sensor signal estimate of each unknown input observer 30 by executing the plurality of unknown input observers 30.

The unknown input observer 30 may include a plurality of unknown input observers 30 that are associated one-to-one with a plurality of actuators of the UGV 10, and, in order to detect a failure of an actuator of the UGV 10, the processor 110 may be configured to determine the residue between the sensor signal estimate of each unknown input observer 30 of the plurality of unknown input observers 30 and the sensor signal, and determine whether there is a failure in the actuator associated with each unknown input observer 30 on the basis of the determined residue.

In order to determine whether there is a failure in the actuator associated with each unknown input observer 30, the processor 110 may be configured to determine that the actuator corresponding to an unknown input observer in which the residue between the sensor signal estimate of each unknown input observer 30 and the sensor signal exceeds a predetermined threshold is in a failure state.

Hereinafter, a UGV monitoring method according to an embodiment performed by the UGV monitoring apparatus 100 according to an embodiment will be described in detail with reference to FIGS. 3 and 4.

Figure 3:
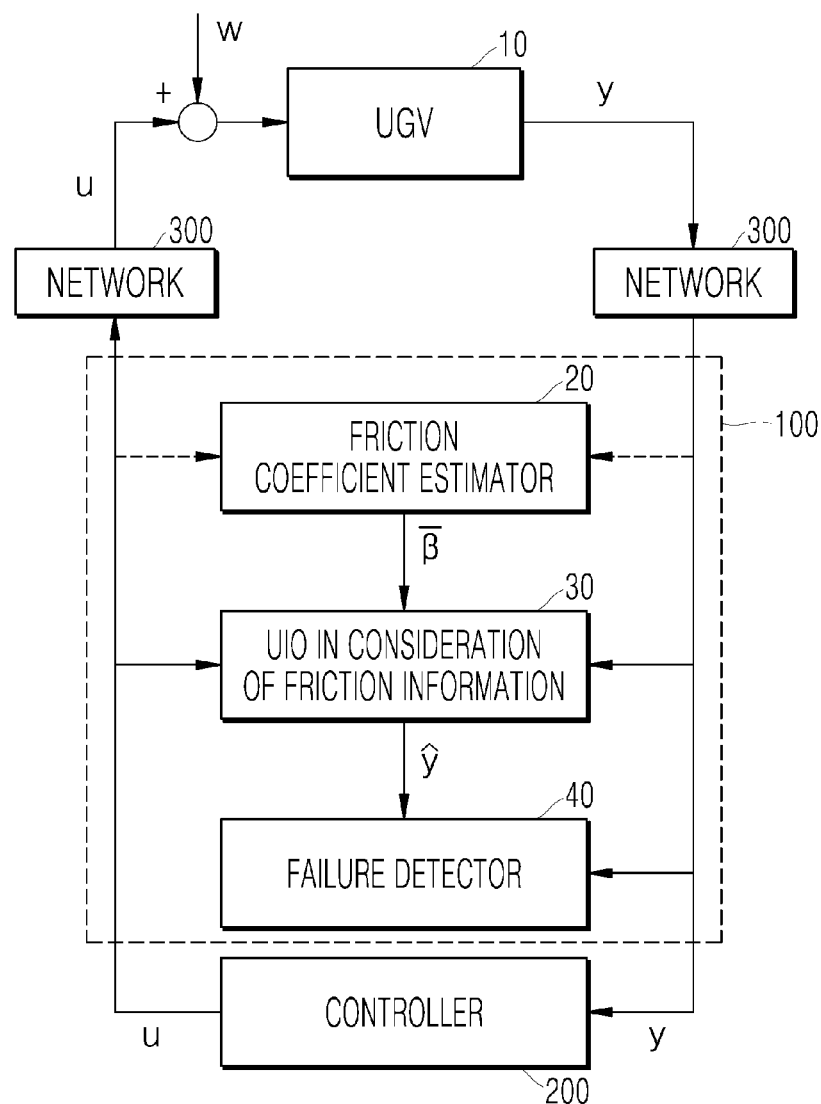
FIG. 3 is a control flowchart of a UGV monitoring apparatus according to an embodiment.

FIG. 3 is a control flowchart of a UGV monitoring apparatus according to an embodiment.

The UGV monitoring apparatus 100 according to the embodiment is an unknown input observer (UIO)-based apparatus for monitoring the state of the UGV 10 in consideration of terrain information. Here, the terrain information includes friction information, for example, a friction coefficient, on the ground surface at the current position of the UGV 10.

The UGV monitoring apparatus 100 includes the processor 110 and the memory 120 as described above with reference to FIG. 2.

The processor 110 may, by executing at least one instruction stored in the memory 120, execute a friction coefficient estimator 20, an unknown input observer 30, and a failure detector 40 in FIG. 3. Additionally, in one example, the processor 110 may execute the controller 200 by executing at least one instruction stored in the memory 120. The friction coefficient estimator 20, the unknown input observer 30, the failure detector 40, and the controller 200 may be implemented as software modules including a series of instructions.

Meanwhile, hereinafter, although the controller 200 will be described as being executed by the processor 110 of the UGV monitoring apparatus 100, this is only for convenience of explanation, and the controller 200 may be executed in a computing device that is separate from the UGV monitoring apparatus 100, as described above with reference to FIG. 1.

The controller 200 may remotely control the UGV 10 through the network 300. The controller 200 calculates a control input u to the UGV 10 on the basis of a sensor signal y transmitted by the UGV 10. In one example, the controller 200 may generate a control input u on the basis of a result of monitoring the state of the UGV 10 by the UGV monitoring apparatus 100 according to the embodiment.

The UGV 10 may be modeled as a dynamic model in consideration of the influence of the terrain. For example, the UGV 10 may be modeled as a four wheel-based dynamic model in consideration of the influence of terrain.

Here, the four wheels are exemplary and the UGV 10 is not limited thereto, and the UGV 10 may be a vehicle having more or fewer wheels. The dynamic model and related equations below may be appropriately extended and applied depending on the number of wheels of the UGV 10 and the number of actuators for driving the wheels.

The model of the UGV 10 may be expressed as the following Equation 1.

$$\dot{x} = \overline{A}x + B_\rho \tau + F_\rho^{(i)} y \qquad \text{[Equation 1]}$$
$$y = Cx.$$

Here, "x" represents the state of the UGV 10, and "y" represents a sensor signal of at least one sensor disposed in the UGV 10.

The movement of the UGV 10, that is, the amount of state change $\dot{x}$ is determined by the current state x of the UGV 10 and the control input $\tau$.

The state x is a vector based on the current position of the UGV 10 and includes the global position $(x_g, y_g)$, yaw angle $(\theta_g)$, velocity $(\dot{x}_g, \dot{y}_g)$, and yaw velocity $(\dot{\theta}_g)$ of the UGV 10.

"$\tau$" is a control input to the actuator of the UGV 10, and corresponds to a vector including four motor torques ($\tau_1$, $\tau_2$, $\tau_3$, $\tau_4$). "$\omega$" corresponds to a failure signal of the actuator (i.e., a motor) of the UGV 10.

The sensor signal y is obtained on the basis of a matrix C and the state x. The matrix C extracts information necessary for detecting a failure of the actuator of the UGV 10 from among the information included in the state x. For example, referring to the matrix C illustrated in Equation 2, which will be described below, the exemplary sensor signal y may include the global position $(x_g, y_g)$, yaw angle $(\theta_g)$, and yaw velocity $(\dot{\theta}_g)$ of the UGV 10.

Equation 2 represents the state vector x and the motor torque vector $\tau$.

$$x = \begin{bmatrix} x_q \\ y_q \\ \theta_q \\ \dot{x}_q \\ \dot{y}_q \\ \dot{\theta}_q \end{bmatrix}, \tau = \begin{bmatrix} \tau_1 \\ \tau_2 \\ \tau_3 \\ \tau_4 \end{bmatrix} \qquad \text{[Equation 2]}$$

Meanwhile, the matrix [A, $B_\rho$, $F_\rho$, C] shown in Equation 1 is defined as Equation 3 below.

$$A = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & -\frac{\beta}{m} & 0 & 0 \\ 0 & 0 & 0 & 0 & -\frac{\beta}{m} & 0 \\ 0 & 0 & 0 & 0 & 0 & -\frac{\beta}{I} \end{bmatrix} \qquad \text{[Equation 3]}$$

$$B_\rho = \begin{bmatrix} 0 & 0 & 0 & 0 \\ 0 & 0 & 0 & 0 \\ 0 & 0 & 0 & 0 \\ \rho_2 & \rho_1 & \rho_2 & \rho_1 \\ \rho_1 & -\rho_2 & \rho_1 & -\rho_2 \\ h & -h & -h & h \end{bmatrix}$$

$$F_\rho = B_\rho = \left( F_\rho^{(1)} F_\rho^{(2)} F_\rho^{(3)} F_\rho^{(4)} \right)$$

$$C = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 0 & 0 & 1 \end{bmatrix}$$

Here, "$\beta$" is the actual friction coefficient of the ground surface at the current position of the UGV 10, "m" is the mass of the UGV 10, and "I" is the moment of inertia.

$\rho_1$, $\rho_2$, and h are defined as Equation 4 below.

$$\rho_1 = \frac{\cos(\theta_q) + \sin(\theta_q)}{2mR}, \rho_2 = \frac{\cos(\theta_q) - \sin(\theta_q)}{2mR}, h = \frac{a+b}{2IR} \qquad \text{[Equation 4]}$$

Here, "R" denotes a wheel radius of the UGV 10, and "a" and "b" denote a front length and a side length of the UGV 10, respectively.

The system matrix A in Equation 3 is a constant matrix determined by the friction coefficient $\beta$ applied to the UGV 10 and the total mass m of the UGV 10. The matrix $B_\rho$ in Equation 3 is a time varying matrix determined by the yaw angle of the UGV 10. Here, $B_\rho$ includes $\rho_1$ and $\rho_2$, which are time varying parameters, and thus the UGV 10 model of Equation 1 is configured as a linear parameter varying system (LPV).

As seen in Equation 4, $\rho_1$ and $\rho_2$ are defined on the basis of a sine function and a cosine function, and are used to express the time varying matrix in the design of the unknown input observer 30.

The matrix C in Equation 3 is a constant matrix, and corresponds to sensor information required to determine whether there is a failure in the UGV 10.

The global position, yaw angle, and yaw velocity of the UGV 10 may be obtained from sensor values of sensors mounted to the UGV 10. Here, the sensors include a GPS sensor, an IMU sensor, a gyro sensor, and the like.

Since the failure signal w of the UGV 10 may be regarded as being added to the input of each motor of the UGV 10, the failure matrix $F_\rho$ in Equation 3 may be configured as the same matrix as the input matrix $B_\rho$.

For the design of the unknown input observer 30, the failure matrix $F_\rho$ may be expressed by dividing the input matrix $B_\rho$ into four columns. As a result, the failure matrix $F_\rho$ is expressed as Equation 5 below.

$$F_\rho = B_\rho = \left( F_\rho^{(1)} F_\rho^{(2)} F_\rho^{(3)} F_\rho^{(4)} \right) \qquad \text{[Equation 5]}$$

Each column of the input matrix $B_\rho$ is an input signal to each actuator of the UGV 10. In other words, each column of the failure matrix $F_\rho$ corresponds to a failure signal for each actuator of the UGV 10.

In one example, one unknown input observer 30 is designed for each actuator of the UGV 10. That is, the unknown input observer 30 is designed for each column of the failure matrix $F_\rho$. Therefore, it is possible to identify which actuator among a plurality of actuators (e.g., four actuators) has an abnormality through the unknown input observer 30. The friction coefficient estimator 20 may determine the terrain information of the place where the UGV 10 is located, for example, a friction information estimate $\bar{\beta}$. Here, the friction information estimate $\bar{\beta}$ indicates an approximation of the friction coefficient $\beta$ of the ground surface where the UGV 10 is currently located.

The friction coefficient estimator 20 transmits the determined friction information estimate $\bar{\beta}$ to the unknown input observer 30.

In one example, the friction coefficient estimator 20 may estimate the smoothness of the ground surface from an image taken by utilizing an image sensor such as a camera mounted to the UGV 10, and determine the friction information estimate $\bar{\beta}$ based thereon (for example, the more slippery the ground surface, the smaller the friction information estimate $\bar{\beta}$).

In one example, the friction coefficient estimator 20 may obtain the friction information estimate $\bar{\beta}$ through estimation based on a model or learning, or an external terrain database. For example, the friction coefficient estimator 20 may determine the friction information estimate $\bar{\beta}$ on the basis of a Kalman filter and a tire model for the tire mounted to the UGV 10 (see J. Hu, S. Rakheja, Y. Zhang, "Tire-Road Friction Coefficient Estimation under Constant Vehicle Speed Control," IFAC, pp. 136-141, 2019).

In one example, the friction coefficient estimator 20 may obtain the friction information estimate $\bar{\beta}$ by utilizing an estimation technique. To this end, the following Equation 6 may be derived from the dynamic model of Equation 1 described above.

$$\ddot{\theta}_q = -\frac{\beta}{I}(\dot{\theta}_q) + h\tau_1 - h\tau_2 - h\tau_3 + h\tau_4 \qquad \text{[Equation 6]}$$

Equation 6 may be transformed into the following Equation 7 to obtain the friction information estimate $\bar{\beta}$.

$$\bar{\beta} = \frac{I}{\dot{\theta}_q}\left(-D(\dot{\theta}_q) + h\tau_1 - h\tau_2 - h\tau_3 - h\tau_4\right) \qquad \text{[Equation 7]}$$

Here, the torques ($\tau_1$, $\tau_2$, $\tau_3$, $\tau_4$) of the respective actuators of the UGV 10 are values obtainable from the outputs u of the controller 200. "h" is a constant determined by the form of the UGV 10. $\dot{\theta}_g$ is a value obtainable through the sensor of the UGV 10, and $D(\dot{\theta}_g)$ is a differential filter capable of calculating the amount of change in $\dot{\theta}_g$.

The unknown input observer 30 is designed on the basis of the UGV rated model in consideration of the influence of terrain. The UGV rated model is defined by Equation 8 below.

$$\dot{x} = \overline{A}x + B_\rho\tau + F_\rho^{(i)}y \quad \text{[Equation 8]}$$
$$y = Cx.$$

The UGV rated model indicates a mathematical model in which each parameter of the UGV model is expressed as a known value. Here, the friction coefficient $\beta$ is an unknown value, so the friction information estimate $\overline{\beta}$ is introduced to generate the UGV rated model.

The symbols included in Equation 8 correspond to the same symbols as those in Equations 1 to 5. The matrix $\overline{A}$ in Equation 8 is defined according to Equation 9 below.

$$\overline{A} = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & -\dfrac{\overline{\beta}}{m} & 0 & 0 \\ 0 & 0 & 0 & 0 & -\dfrac{\overline{\beta}}{m} & 0 \\ 0 & 0 & 0 & 0 & 0 & -\dfrac{\overline{\beta}}{I} \end{bmatrix} \quad \text{[Equation 9]}$$

In Equation 9, the friction information estimate $\overline{\beta}$, as an approximation of the friction coefficient $\beta$, corresponds to the value determined by the friction coefficient estimator 20.

The UGV monitoring apparatus 100 according to the embodiment includes a plurality of unknown input observers 30.

In one example, the UGV monitoring apparatus 100 may include as many unknown input observers 30 as the number of actuators of the UGV 10 to be monitored. In one example, the respective unknown input observers 30 may be associated one-to-one with the actuators of the UGV 10. For example, the UGV monitoring apparatus 100 may include a plurality of unknown input observers 30 designed in connection with the actuators of the UGV 10.

As described above with reference to Equation 5, the unknown input observer 30 is designed for each column vector ($F_\rho^{(1)}$, $F_\rho^{(2)}$, $F_\rho^{(3)}$, $F_\rho^{(4)}$) of the failure vector $F_\rho$ according to the following Equation 10

That is, the $i^{th}$ unknown input observer 30 is defined according to Equation 10 below.

$$\dot{z}^{(i)} = N_\rho^{(i)} P_\rho^{(i)} + G_\rho^{(i)}\tau + L_\rho^{(i)}y \quad \text{[Equation 10]}$$
$$\hat{x}^{(i)} = z^{(i)} - H_\rho^{(i)}y,$$
$$\hat{y}^{(i)} = C\hat{x}^{(i)}$$

Here, $z^{(i)}$ represents the state of the $i^{th}$ unknown input observer 30 of the UGV monitoring apparatus 100, $\hat{x}^{(i)}$ represents the state of the UGV 10 estimated by the $i^{th}$ unknown input observer 30, and $\hat{y}^{(i)}$ represents a sensor estimate of the UGV 10 estimated by the $i^{th}$ unknown input observer 30.

Each unknown input observer 30, that is, the $i^{th}$ unknown input observer 30, estimates the state $\hat{x}^{(i)}$ of the UGV 10 according to Equation 10, and calculates the sensor estimate $\hat{y}^{(i)}$ on the basis of the estimated state $\hat{x}^{(i)}$ of the UGV 10.

Meanwhile, the $i^{th}$ unknown input observer 30 is defined on the basis of a design matrix ($N_\rho^{(i)}$, $G_\rho^{(i)}$, $L_\rho^{(i)}$, $H_\rho^{(i)}$).

Each unknown input observer 30 of the UGV monitoring apparatus 100 may generate the design matrix ($N_\rho^{(i)}$, $G_\rho^{(i)}$, $L_\rho^{(i)}$, $H_\rho^{(i)}$ in Equation 10 described above, which is a state equation of each unknown input observer 30, on the basis of the friction information estimate $\overline{\beta}$ calculated by the friction coefficient estimator 20. The specific definition of the design matrix ($N_\rho^{(i)}$, $G_\rho^{(i)}$, $L_\rho^{(i)}$, $H_\rho^{(i)}$ in Equation 10 will be described below with reference to six steps of Step 1 to Step 6.

The failure detector 40 is designed on the basis of the above-described UGV rated model and the unknown input observer 30 based thereon.

The failure detector 40 may calculate a residue signal $\gamma^{(i)}$ of each unknown input observer 30 according to the following Equation 11, and identify and detect whether there is a failure in the actuator of the UGV 10 on the basis of the calculated residue signal $\gamma^{(i)}$.

$$\gamma^{(i)} = |\hat{y}^{(i)} - y| \quad \text{[Equation 11]}$$

The residue signal $\gamma^{(i)}$ indicates the difference between the sensor estimate $\hat{y}^{(i)}$ of the $i^{th}$ unknown input observer 30 and the sensor value y (see Equation 1) received from the UGV 10.

Hereinafter, a process of determining a failure by the failure detector 40 will be described. For convenience of description, it is assumed that a failure occurs in a first actuator among a plurality of actuators (e.g., four actuators) of the UGV 10.

When a failure occurs in the first actuator of the UGV 10, the first unknown input observer 30 designed associated with the first actuator is able to accurately estimate the state of the UGV 10, but other actuators, that is, the second, third, and fourth unknown input observers 30 designed associated with the second, third, and fourth actuators, respectively, are unable to accurately estimate the state of the UGV 10. This is due to the fact that only the first unknown input observer 30 reflects the influence of the first failure vector $F_\rho^{(1)}$ in its own design.

In other words, when a failure occurs in the first actuator, the estimation error $e^{(1)}$ of the first unknown input observer 30 reflecting the first failure vector $F_\rho^{(1)}$ in the design approaches 0 as time passes, but the estimation errors $e^{(2)}$, $e^{(3)}$, $e^{(4)}$ of the second, third, and fourth unknown input observers 30 are unable to approach 0 because the first failure vector $F_\rho^{(1)}$ is not reflected in the design. Here, the residue signal $\gamma^{(i)}$ is a function of the estimation error $e^{(i)}$.

Consequently, the residue signal $\gamma^{(i)}$ provides a clue for detection of a failure. In the preceding example, when the first actuator fails, the remaining residue signals excluding the first residue signal $\gamma^{(i)}$ that is, the second, third, and fourth residue signals $\gamma^{(2)}$, $\gamma^{(3)}$, $\gamma^{(4)}$ will respond to a failure by exceeding a predetermined threshold, and it is possible to accurately determine that a failure has occurred in the first actuator according thereto.

The UGV monitoring apparatus 100 may reflect the frictional force-related information that may occur while the UGV 10 is running, that is, the friction information estimate $\overline{\beta}$, in the design of the unknown input observer 30, thereby minimizing the influence of the actual friction coefficient β on the residue. In addition, according to the embodiment, it is possible to accurately determine whether there is a failure in the actuator of the UGV 10.

Figure 4:
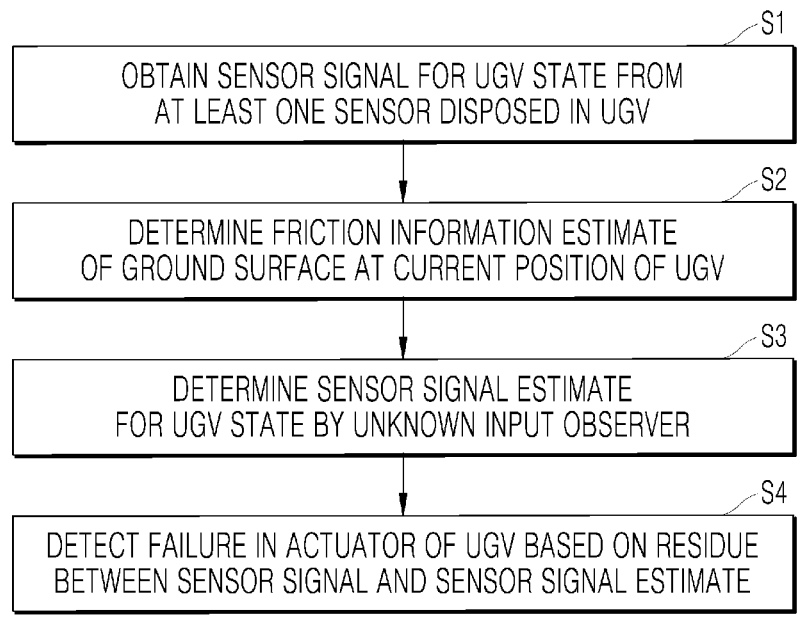
FIG. 4 is a flowchart illustrating a UGV monitoring method according to an embodiment.

FIG. 4 is a flowchart illustrating a UGV monitoring method according to an embodiment.

The UGV monitoring method according to the embodiment includes Step S1 of obtaining a sensor signal y for the UGV state from at least one sensor disposed in the UGV 10, Step S2 of determining a friction information estimate $\bar{\beta}$ of the ground surface at the current position of the UGV 10, Step S3 of determining a sensor signal estimate $\hat{y}$ for the UGV state by the unknown input observer 30 designed on the basis of the determined friction information estimate $\bar{\beta}$, and Step S4 of detecting a failure of an actuator of the UGV 10 on the basis of the residue γ between the sensor signal y and the sensor signal estimate $\hat{y}$.

In Step S1, the processor 110 may obtain the sensor signal y for the UGV state from at least one sensor disposed in the UGV 10.

The processor 110 may obtain the sensor signal y from the UGV 10 through the network 300. In another example, the processor 110 may obtain the UGV state x from the UGV 10 through the network 300, and the processor 110 may extract the sensor signal y on the basis of the same.

In one example, the sensor signal y is a vector determined on the basis of the matrix C and the current state x of the UGV 10 with reference to Equations 1, 2, and 3 described above.

For example, according to the matrix C shown in Equation 3, the sensor signal y may correspond to a vector including the global position, yaw angle, and yaw rate of the UGV 10.

In Step S2, the processor 110 may determine the friction information estimate $\bar{\beta}$ of the ground surface at the current position of the UGV 10 by executing the friction coefficient estimator 20.

Here, the friction information estimate $\bar{\beta}$ includes an approximation of the friction coefficient β of the ground surface at the current position of the UGV 10.

As described above with reference to FIG. 3, the friction coefficient estimator 20 may obtain the friction information estimate $\bar{\beta}$ through direct measurement using, for example, an image sensor such as a camera mounted to the UGV 10, estimation based on the model or learning, or an external terrain database.

In one example, the friction coefficient estimator 20 may obtain the friction information estimate $\bar{\beta}$ by utilizing the estimation technique according to Equations 6 and 7.

In Step S3, the processor 110 may execute the unknown input observer 30 designed on the basis of the friction information estimate $\bar{\beta}$ determined in Step S2, thereby determining a sensor signal estimate $\hat{y}$ for the state of the UGV 10.

Step S3 may include the step of executing the unknown input observer 30 designed on the basis of the UGV rated model based on the friction information estimate $\bar{\beta}$ by the processor 110.

Referring to FIG. 3, the unknown input observer 30 is defined according to Equation 10.

The UGV rated model indicates a mathematical model in which the respective parameters of the UGV model are expressed as known values. Here, the friction coefficient β is an unknown value, so the friction information estimate $\bar{\beta}$ is introduced to generate the UGV rated model.

The UGV rated model is defined according to Equation 8 described above.

In one example, the UGV rated model is a dynamic model based on a system matrix $\overline{A}$ for the UGV state and a failure matrix $F_\rho$ corresponding to a failure signal w of the actuator of the UGV 10.

For example, the system matrix $\overline{A}$ corresponds to a constant matrix including a constant defined on the basis of the friction information estimate $\bar{\beta}$ and the mass (m) of the UGV 10 with reference to Equation 9.

For example, the failure matrix $F_\rho$ corresponds to a time varying matrix including time varying parameters $\rho_1$ and $\rho_2$ defined on the basis of the yaw angle of the UGV 10 with reference to Equations 3 and 4.

The unknown input observer 30 may include a plurality of unknown input observers 30 associated one-to-one with a plurality of actuators of the UGV 10. For example, the UGV monitoring apparatus 100 may include as many unknown input observers 30 as the number of actuators of the UGV 10 to be monitored, and the respective unknown input observers 30 may be associated one-to-one with the actuators of the UGV 10.

Step S3 may include the step of determining a sensor signal estimate $\hat{y}$ of each unknown input observer by executing the plurality of unknown input observers.

In Step S4, the processor 109 may detect a failure of the actuator of the UGV 10 on the basis of the residue γ between the sensor signal y and the sensor signal estimate $\hat{y}$. Here, the residue γ is defined according to Equation 11.

Step S4 may include the step of determining a residue γ between the sensor signal estimate $\hat{y}$ of each of the plurality of unknown input observers 30 determined in Step S3 and the sensor signal y obtained in Step S1, and the step of determining whether there is a failure in the actuator associated with each unknown input observer 30 on the basis of the determined residue γ.

In one example, the step of determining whether there is a failure in the actuator associated with each unknown input observer 30 may include the step of determining that the actuator corresponding to the unknown input observer 30 of which the residue γ exceeds a predetermined threshold is in a failure state.

Here, the predetermined threshold may be determined according to the UGV 10, the actuator, or the terrain information on the current position of the UGV 10.

Figure 5A:
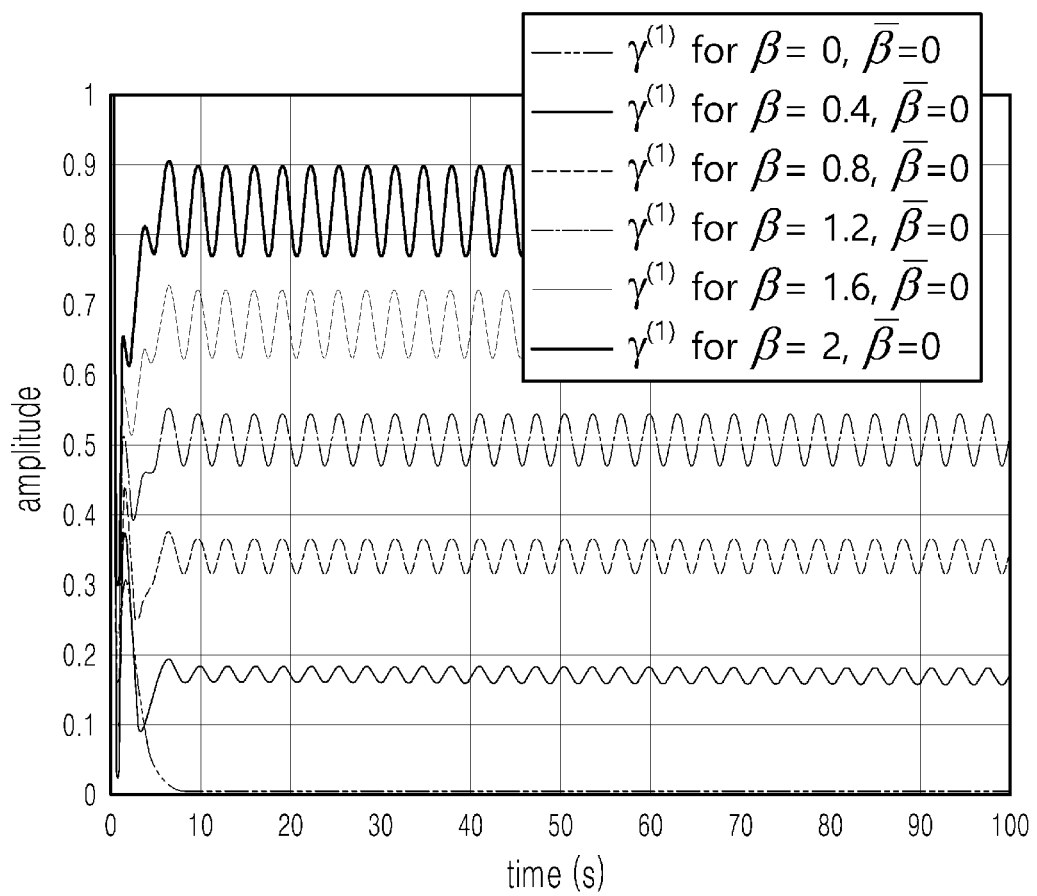
FIG. 5A is a graph exemplarily showing results of monitoring a UGV without considering friction information.

FIG. 5A is a graph exemplarily showing results of monitoring a UGV without considering friction information.

FIG. 5A shows that the residue reacts under the influence of the friction coefficient β and that the higher the friction coefficient β, the greater the influence on the residue as a result of observing the first residue γ(1), using an unknown input observer designed without considering the influence of the friction coefficient β.

That is, since the residue becomes larger as the friction coefficient β increases, there may be a malfunction in which it is determined that a failure has occurred even though the actuator of the UGV 100 does not have a failure.

Figure 5B:
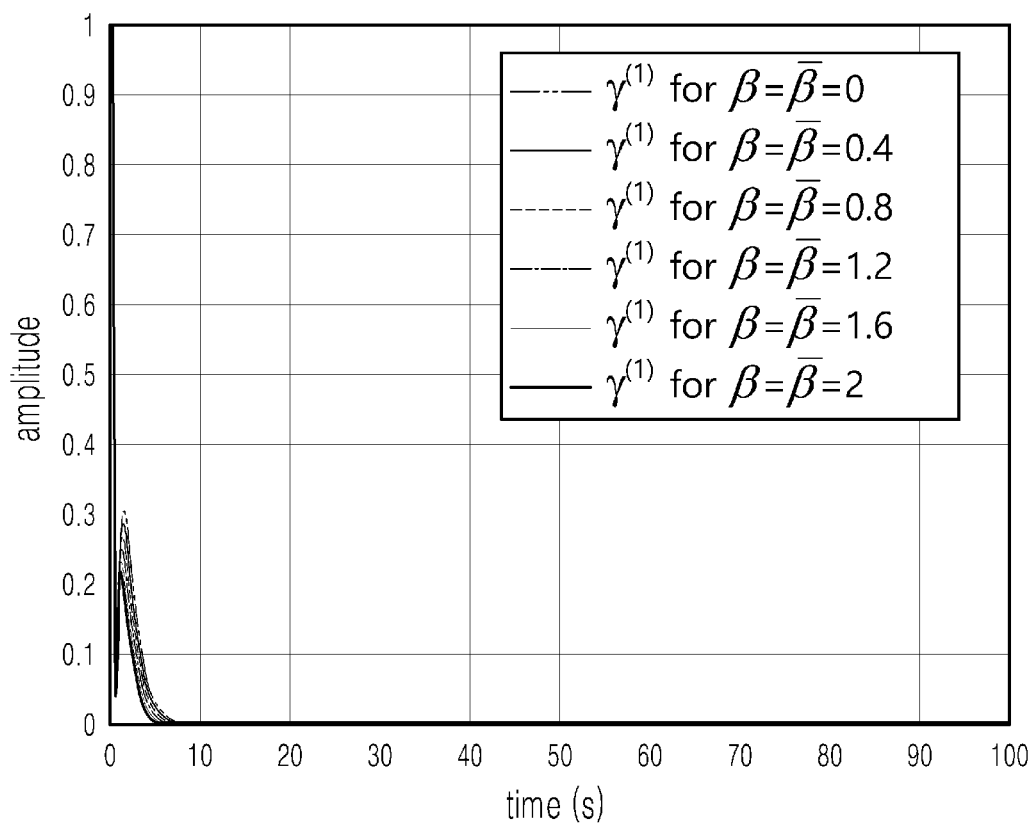
FIG. 5B is a graph exemplarily showing a failure detection result by monitoring a UGV according to an embodiment.

FIG. 5B is a graph exemplarily showing a failure detection result of monitoring a UGV according to an embodiment.

FIG. 5B shows that the residue $\gamma^{(1)}$ does not react according to a change in the friction coefficient β and that the influence of the friction coefficient β on the residue $\gamma^{(1)}$ is reduced compared to FIG. 5A, as a result of observing the first residue $\gamma^{(1)}$ using a UGV monitoring apparatus 100 according to the embodiment including the unknown input observer 30 designed in consideration of the influence of the friction coefficient β.

That is, it is possible to reduce malfunctioning in determining a failure of the actuator of the UGV 10 by reflecting the approximation $\bar{\beta}$ of the friction coefficient $\beta$ in the design of the unknown input observer 30.

Figure 6:
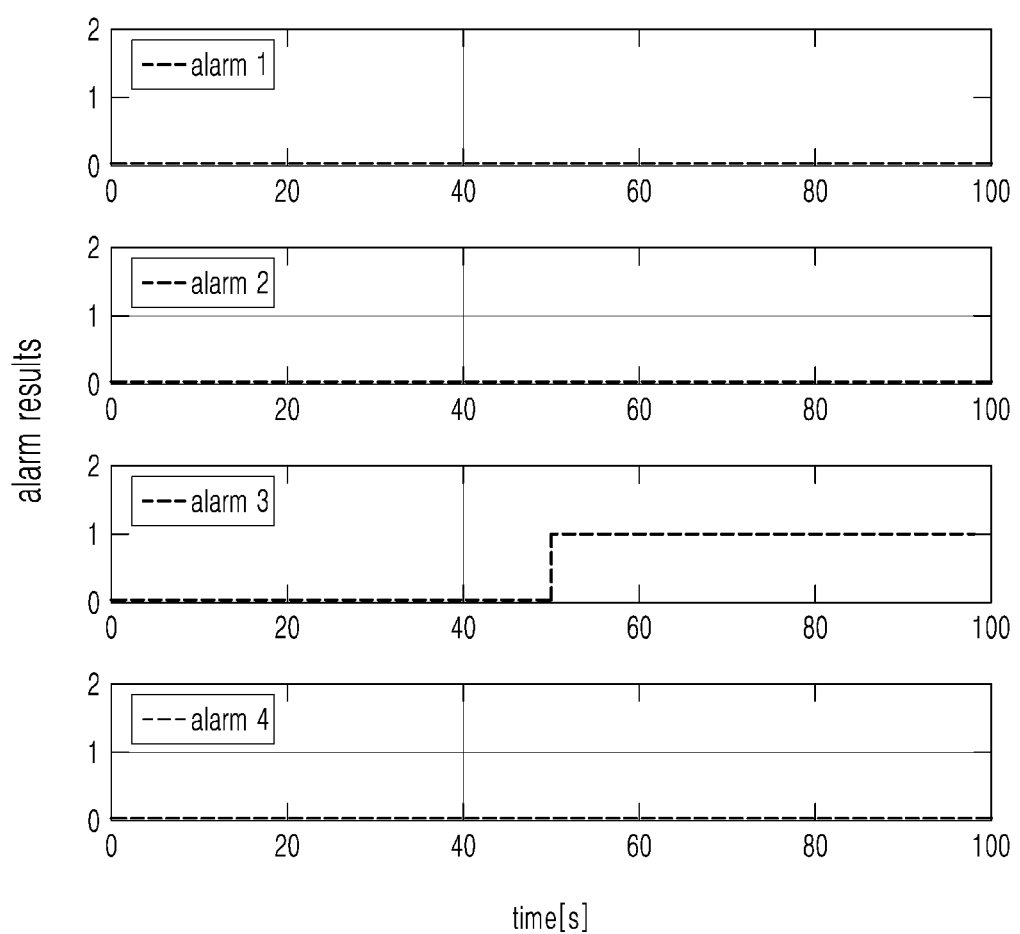
FIG. 6 is a graph exemplarily showing a failure detection result by monitoring a UGV according to an embodiment.

FIG. 6 is a graph exemplarily showing failure detection results by monitoring a UGV according to an embodiment.

In the case where a failure occurs in the third actuator of the UGV 10 at about 50 seconds, an alarm for a failure of the third actuator (alarm 3) sounds. That is, the UGV monitoring apparatus 100 according to the embodiment may accurately determine which actuator has a failure while the UGV 10 travels on the ground surface with friction.

Hereinafter, a process of designing the unknown input observer 30 will be described.

The UGV 10 is expressed as a linear parameter varying (LPV) system. Hereinafter, a process of calculating design matrices for the unknown input observer 20 of the UGV monitoring apparatus 100 according to an embodiment using a UIO design technique for an LPV system will be described.

The following process is for causing the influences due to the error in estimation of the UGV state by the unknown input observer 30 and disturbance/failure to converge to 0, and the influence of the approximation $\bar{\beta}$ of the friction coefficient $\beta$ is reflected in the design of the unknown input observer 30 according to the above process.

Step 1: $H_\rho^{(i)} = -F_\rho^{(i)} (CF_\rho^{(i)})^\dagger$
Here, † denotes the pseudo inverse of the matrix.
Step 2: $P_\rho^{(i)} = I_{6\times 6} + H_\rho^{(i)} C$
Here, $I_{6\times 6}$ denotes an identity matrix.
Step 3: $G_{\rho(i)} = P_\rho^{(i)} B_\rho$
Step 4: $\hat{A}_{\rho,\rho}^{(i)} = \dot{P}_\rho^{(i)} + P_\rho^{(i)} \overline{A}$
Step 5: $N_\rho^{(i)} = \hat{A}^{\rho,\rho(i)} - K_\mu^{(i)} C$
Here, $K_\mu$ is designed such that $N_\rho$ becomes a Hurwiz matrix.
Step 6: $L_\rho^{(i)} = K_\mu^{(i)} - N_\rho^{(i)} H_\rho^{(i)}$ The design matrix of the unknown input observer 30 in Equation 10 is derived through Step 1 to Step 6.

Hereinafter, it will be shown that the unknown input observer 30 of the UGV monitoring apparatus 100 according to the embodiment is able to accurately estimate the state of the UGV 10 even if there is a failure or disturbance signal.

The above-described UGV rated model and unknown input observer 30 are reviewed again.

(1) UGV rated model in consideration of $i^{th}$ actuator (see Equation 8)

$$\dot{x} = \overline{A}x + B_\rho \tau + F_\rho^{(i)} y$$

$$y = Cx.$$

(2) Unknown input observer for $i^{th}$ actuator (see Equation 10)

$$\dot{z}^{(i)} = N_\rho^{(i)} P_\rho^{(i)} + G_\rho^{(i)} \tau + L_\rho^{(i)} y$$

$$\hat{x}^{(i)} = z^{(i)} - H_\rho^{(i)} y$$

(1) and (2) are used to derive error dynamics. Here, the error $e^{(i)}$ of the $i^{th}$ unknown input observer 30 is defined as the difference between the UGV state x and the UIO state estimation $\hat{x}^{(i)}$.

$$e^{(i)} = x - \hat{x}^{(i)} \qquad \text{[Equation 12]}$$

The error $e^{(i)}$ of the $i^{th}$ unknown input observer 30 may be expressed as the following equation.

$$\begin{aligned} e^{(i)} &= x - z^{(i)} + H_\rho^{(i)} y \\ &= x - z^{(i)} + H_\rho^{(i)} Cx \\ &= (I_{6\times 6} + H_\rho^{(i)} C)x - z^{(i)} \\ &= P_\rho^{(i)} x - z^{(i)} \end{aligned} \qquad \text{[Equation 13]}$$

If the amount of change in the error $e^{(i)}$ of the $i^{th}$ unknown input observer 30 is calculated on the basis of Equation 13, the error dynamics may be obtained as shown in Equation 14 below.

$$\begin{aligned} \dot{e}^{(i)} &= \dot{P}_\rho^{(i)} x + P_\rho^{(i)} \dot{x} - \dot{z}^{(i)} \\ &= \dot{P}_\rho^{(i)} x + P_\rho^{(i)} (\overline{A}x + B_\rho \tau + F_\rho^{(i)} \omega) - (N_\rho^{(i)} z^{(i)} + G_\rho^{(i)} \tau + L_\rho^{(i)} y) \end{aligned} \qquad \text{[Equation 14]}$$

The six steps of the above-described design condition of the unknown input observer 30, that is, Step 1 to Step 6, indicate the following equation.

$$\dot{P}_\rho^{(i)} + P_\rho^{(i)} \overline{A} - N_\rho^{(i)} P_\rho^{(i)} C = 0 \qquad \text{[Equation 15]}$$

$$P_\rho^{(i)} B_\rho^{(i)} = G_\rho^{(i)}$$

$$P_\rho^{(i)} F_\rho^{(i)} = 0$$

Equation 15 indicates that the dynamics for the error $e^{(i)}$ of the $i^{th}$ unknown input observer 30 in Equation 14 satisfies Equation 16 below.

$$\dot{e}^{(i)} = N_\rho^{(i)} e^{(i)} \qquad \text{[Equation 16]}$$

Here, since $N_\rho^{(i)}$ is designed as Hurwitz, Equation 16 indicates that the error $e^{(i)}$ of the $i^{th}$ unknown input observer 30 approaches 0 over time. That is, $\hat{x}^{(i)}$ converges to x ($\hat{x}^{(i)} \to x$) over time.

Accordingly, the unknown input observer 30 of the UGV monitoring apparatus 100 according to the embodiment is able to guarantee correct estimation of the UGV state even in the presence of disturbance and failure signals.

The method according to embodiments of the present disclosure described above may be implemented as computer-readable code stored in a non-transitory storage medium in which a program is recorded. The computer-readable storage medium includes all types of recording devices in which data readable by a computer system is stored. Examples of the computer-readable non-transitory storage medium include a hard disk drive (HDD), a solid state disk (SSD), a silicon disk drive (SDD), ROM, RAM, CD-ROM, a magnetic tape, a floppy disk, optical data storage devices, etc.

The above description of the embodiments of the present disclosure is provided by way of illustrative example, and it will be understood by those skilled in the art to which the present disclosure pertains that the present disclosure can be easily modified to another specific form without changing the technical idea or essential characteristics thereof. Therefore, it should be understood that the embodiments described above are illustrative and are not restrictive in all respects. For example, each element described as a single type may be implemented in a distributed form, and likewise elements described as being distributed may be implemented in a combined form.

The scope of the present disclosure is indicated by the claims to be described below, rather than by the above detailed description, and it should be construed that all changes or modifications derived from the meaning and scope of the claims and equivalent concepts thereto are included in the scope of the present disclosure.

What is claimed is:

1. A method for monitoring an unmanned ground vehicle (UGV) having a plurality of actuators, the method comprising:
obtaining a sensor signal for a UGV state from at least one sensor disposed in the UGV;
determining a friction information estimate of a ground surface at a current position of the UGV, wherein the friction information estimate is estimated by a smoothness of the ground surface from an image of an image sensor of the UGV;
determining a sensor signal estimate for the UGV state by an unknown input observer designed on the basis of the friction information estimate;
detecting whether there is a failure in each of the plurality of actuators of the UGV on the basis of a residue between the sensor signal and the sensor signal estimate; and
sounding an alarm for an actuator where there is the failure among the plurality of actuators,
wherein the determining of the sensor signal estimate comprises executing the unknown input observer designed on the basis of a UGV rated model based on the friction information estimate, and
wherein the UGV rated model is a dynamic model based on a system matrix for the UGV state and a failure matrix corresponding to a failure signal of the actuator of the UGV.

2. The method of claim 1, wherein the sensor signal corresponds to a vector comprising a global position, a yaw angle, and a yaw rate of the UGV.

3. The method of claim 1, wherein the system matrix is a constant matrix comprising a constant defined on the basis of the friction information estimate and a mass of the UGV.

4. The method of claim 1, wherein the failure matrix corresponds to a time varying matrix comprising a time varying parameter defined on the basis of a yaw angle of the UGV.

5. The method of claim 1,
wherein the unknown input observer comprises a plurality of unknown input observers associated one-to-one with the plurality of actuators of the UGV, and
wherein the determining of the estimate for the sensor signal comprises determining a sensor signal estimate of each unknown input observer by executing the plurality of unknown input observers.

6. The method of claim 1,
wherein the unknown input observer comprises a plurality of unknown input observers associated one-to-one with the plurality of actuators of the UGV, and
wherein the detecting of the failure comprises:
determining a residue between the sensor signal estimate of each unknown input observer of the plurality of unknown input observers and the sensor signal; and
determining whether there is the failure in the actuator associated with each unknown input observer on the basis of the residue.

7. The method of claim 6, wherein the determining of whether there is a failure comprises determining that an actuator corresponding to an unknown input observer of which the residue exceeds a predetermined threshold is in a failure state.

8. An apparatus for monitoring a UGV having a plurality of actuators, the apparatus comprising:
a memory configured to store at least one instruction; and
a processor,
wherein the processor is configured to, by executing the at least one instruction:
obtain a sensor signal for a UGV state from at least one sensor disposed in the UGV;
determine a friction information estimate of a ground surface at a current position of the UGV, wherein the friction information estimate is estimated by a smoothness of the ground surface from an image of an image sensor of the UGV;
determine a sensor signal estimate for the UGV state by an unknown input observer designed on the basis of the friction information estimate;
detect whether there is a failure in each of the plurality of actuators of the UGV on the basis of a residue between the sensor signal and the sensor signal estimate; and
sound an alarm for an actuator where there is the failure among the plurality of actuators,
wherein the processor is configured to execute the unknown input observer designed on the basis of a UGV rated model based on the friction information estimate, and
wherein the UGV rated model is a dynamic model based on a system matrix for the UGV state and a failure matrix corresponding to a failure signal of the actuator of the UGV.

9. The apparatus of claim 8, wherein the sensor signal corresponds to a vector comprising a global position, a yaw angle, and a yaw rate of the UGV.

10. The apparatus of claim 8, wherein the system matrix is a constant matrix comprising a constant defined on the basis of the friction information estimate and a mass of the UGV.

11. The apparatus of claim 8, wherein the failure matrix corresponds to a time varying matrix comprising a time varying parameter defined on the basis of a yaw angle of the UGV.

12. The apparatus of claim 8,
wherein the unknown input observer comprises a plurality of unknown input observers associated one-to-one with the plurality of actuators of the UGV, and
wherein the processor is configured to determine a sensor signal estimate of each unknown input observer by executing the plurality of unknown input observers.

13. The apparatus of claim 8,
wherein the unknown input observer comprises a plurality of unknown input observers associated one-to-one with the plurality of actuators of the UGV, and
wherein, in order to detect the failure, the processor is configured to:

determine a residue between the sensor signal estimate of each unknown input observer of the plurality of unknown input observers and the sensor signal; and
determine whether there is the failure in the actuator associated with each unknown input observer on the basis of the residue.

14. The apparatus of claim 13, wherein, in order to determine whether there is a failure, the processor is configured to determine that an actuator corresponding to an unknown input observer of which the residue exceeds a predetermined threshold is in a failure state.

* * * * *